May 23, 1972   D. L. PEARL ET AL   3,664,574

EGG CARTON

Filed June 29, 1970   2 Sheets-Sheet 1

INVENTORS
DAVID L. PEARL
JOHN G. WALLER
BEVERLY P. HEAD, JR.

BY: Newton, Hopkins, & Ormsby
ATTORNEYS

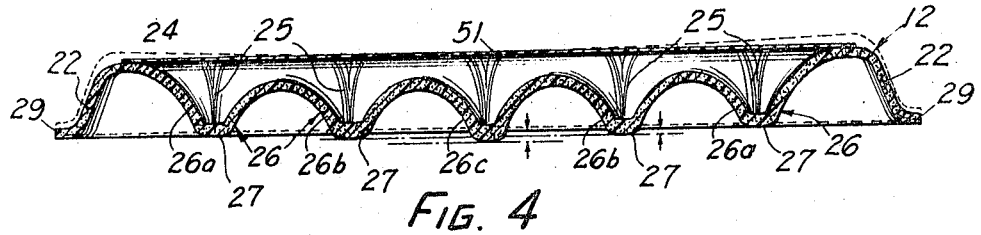
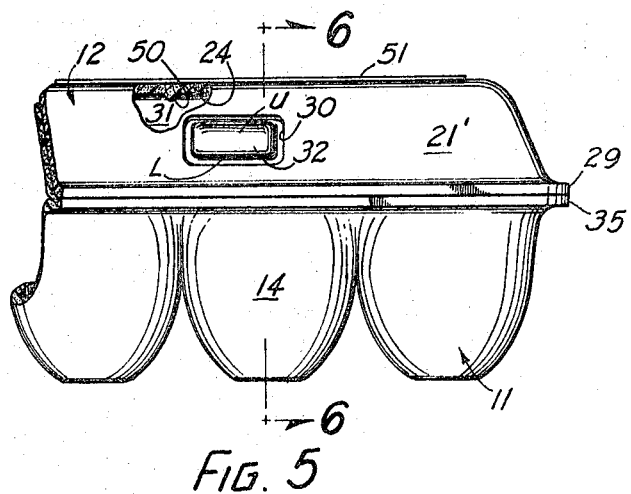
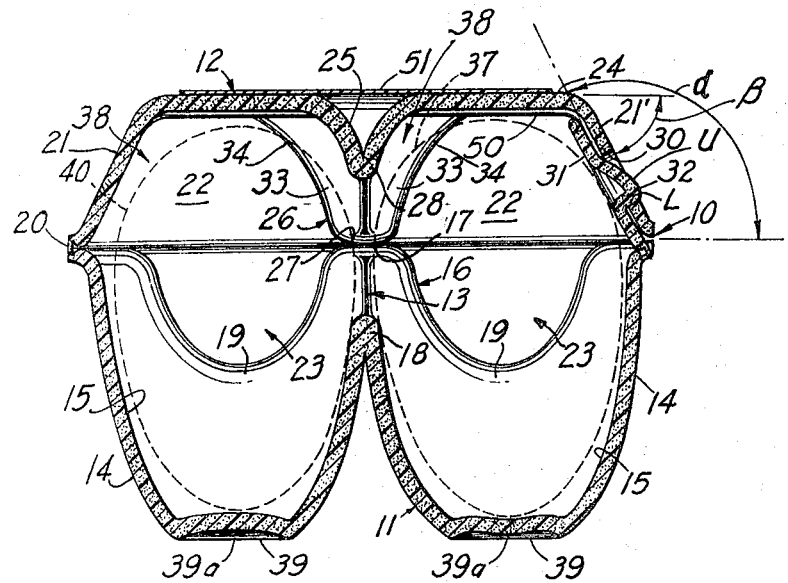
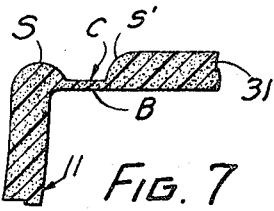
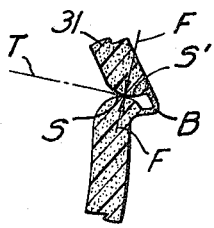

United States Patent Office 3,664,574
Patented May 23, 1972

3,664,574
EGG CARTON
David L. Pearl, Atlanta, and John G. Waller, College Park, Ga., and Beverly P. Head, Jr., Birmingham, Ala., assignors to W. R. Grace & Co., Duncan, S.C.
Continuation-in-part of application Ser. No. 817,279, Apr. 15, 1969, which is a continuation-in-part of application Ser. No. 601,947, Dec. 15, 1966. This application June 29, 1970, Ser. No. 50,791
Int. Cl. B65d 1/24
U.S. Cl. 229—44 R            5 Claims

ABSTRACT OF THE DISCLOSURE

This invention relates to molded, foamed plastic egg cartons with elliptical cells which prevent the eggs stored therein from contacting each other. A locking flap pivotally attached along one edge of the carton includes locking lugs which mate with complementary apertures formed in the cover to firmly hold the cover in its closed position.

REFERENCE TO RELATED APPLICATIONS

This application is a continuation-in-part of applicants' copending application Ser. No. 817,279, filed Apr. 15, 1969, now abandoned, which application is a continuation-in-part of application Ser. No. 601,947, filed Dec. 15, 1966, now abandoned.

BACKGROUND OF THE INVENTION

Storage, protection and shipping of eggs has been a difficult and delicate job because of the fragility of egg shells. In the past, eggs were shipped from the egg producer to the wholesale mechant on filler flats, a flat sheet of material including recesses therein to accommodate thirty eggs. The wholesaler repacked the eggs in retail cartons which contained one dozen eggs and delivered the eggs to the retail merchant. Recently, various retail egg containers or cartons have been fabricated that are strong enough to be used by the egg producer for shipment to the market place, thus eliminating the use of filler flats. The cartons are generally constructed to prevent the eggs therein from damage from outside blows. It has been found, however, that these cartons allowed the eggs therein to be frequently cracked or otherwise damaged by contacting each other, especially during long periods of transit, due to inadequate separation of the eggs within the carton. It is essential that means also be provided to firmly hold the carton in a closed position. Of course, the egg cartons must have a certain amount of stability and rigidity to withstand any damage that might take place from the handling of the cartons and the packaging of the cartons, first without eggs, and subsequently with eggs stored therein. When eggs are stored in the cartons and the cartons are packaged for shipment to the retail merchant, the cartons must support the eggs stored therein and several other cartons that may be stored thereon. Thus, the egg cartons must provide a substantially flat upper supporting surface and have strength enough to support other egg cartons stacked thereon while still protecting the eggs stored therein.

While the producers of egg cartons have met with some success in accomplishing the above listed objectives, many cartons in use today are fabricated of molded pulp, and frequently fail to carry out these functions since the molded pulp tends to lose its structural rigidity when it becomes damp.

SUMMARY OF THE INVENTION

This invention comprises an egg carton constructed of foamed plastic wherein the walls of the carton are generally curvilinear and the internal individual egg receiving compartments are substantially egg shaped. The carton includes a latching mechanism that is formed integral therewith when the carton itself is formed. The structure of the carton is such that the top cover includes a peripheral flange and a series of depending center posts. The center posts extend downwardly from the top to meet upwardly extending complementary posts of the lower section and the flange meets a complementary flange of the lower section when the top is in its closed position, to support the top cover along its centerline and about its peripheral edge. The upwardly extending posts are connected to each other by longitudinal dividers and to the sides of the lower section of the carton by transverse dividers to define the lower portions of the individual egg cells. The downwardly extending posts in the cover are connected to each other by longitudinal separators and transverse separators extend outwardly from each post so as to define the upper portions of the individual egg cells. When the carton is closed, the downwardly extending posts are engaged by the upwardly extending posts and the combination thereof with the dividers and separators serve to define completely segregated individual egg cells in the carton which positively separate the eggs in the carton from each other so as to prevent damage to the eggs from contact with each other.

Thus, it is an object of this invention to provide an egg carton fabricated from an inexpensive, durable, waterproof, soft, lightweight substance that does not readily transfer shock.

Another object of this invention is to provide an egg carton constructed in such a manner that the eggs are maintained in a spaced relationship from each other.

Another object of this invention is to provide an egg carton wherein the top or cover of the carton is supported along its center with the support stresses progressively increasing from each end toward the center of the carton to keep the top flat.

Another object of this invention is to provide an egg carton wherein the lower section and the cover each include a series of complementary center posts that function to maintain the eggs placed in the carton separate from each other by establishing essentially all-encompassing cells.

Another object of this invention is to provide a latching mechanism for an egg carton that positively maintains the cover of the carton latched to its base when used with yieldable biasing means tending to hold the egg carton in a stressed condition.

Another object of this invention is to provide a molded egg carton having rounded egg receiving pockets provided with resilient egg supporting bottom surfaces.

Another object of this invention is to provide an egg carton of a configuration such that the cartons can be nested together with other similar cartons in a convenient manner so that a large number of cartons can be conveniently shipped to the egg producer.

Another object of this invention is to provide an egg carton that is easily manufactured on a mass production basis, economical to handle and ship, and which provides a maximum of protection to the eggs stored therein.

Other objects, features and advantages of the present invention will become apparent upon reading the following specification, taken in conjunction with the accompanying drawing in which:

BRIEF DESCRIPTION OF THE DRAWING

FIG. 4 is a longitudinal sectional view of the cover member taken through the center of the posts to illustrate the variable dimensions of the cover member posts;

FIG. 5 is a fragmentary front elevation view of the egg carton with portions broken away for clarity;

FIG. 6 is an end cross-sectional view of the egg carton taken along lines 6—6 of FIG. 5;

FIGS. 7 and 8 are detailed views of the hinge of the locking flap; and,

DESCRIPTION

Figure 1:
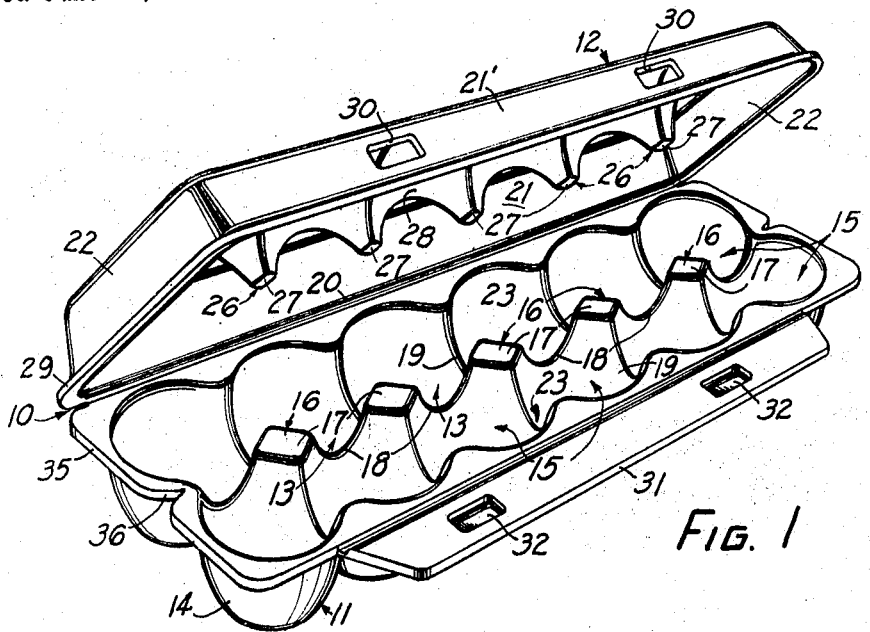
FIG. 1 is a perspective view of the egg carton in an open position.
Figure 2:
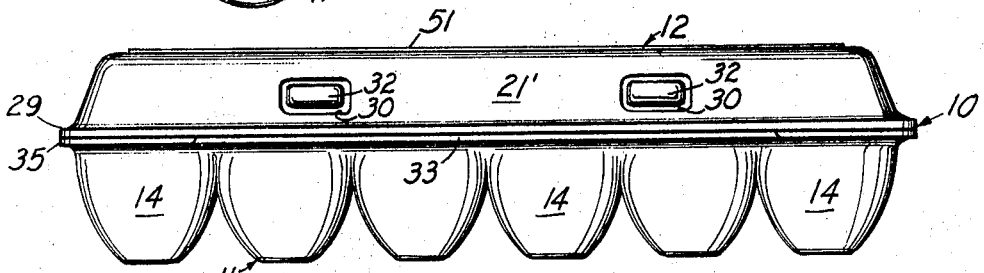
FIG. 2 is a front elevational view of the egg carton in its closed position.

Referring now more particularly to the drawing, in which like numerals indicate like parts throughout the several views, FIG. 1 shows an egg carton 10 of a foamed plastic material comprising a bottom section 11 and a top or cover 12. The bottom section 11 is formed in the shape of two rows of hollow protrusions 14 which are generally hemispherical in shape. The protrusions 14 are concave on their indices to form egg cells or pockets 15. The protrusions are arranged in two adjacent rows so as to house one dozen eggs in their usual and most practical arrangement.

The upwardly extending common junction of each group of four of the protrusions 14 along the center of the bottom section 11 is so formed as to provide a row of upstanding support posts 16 on the inside of the bottom section 11, between the adjacent rows of egg cells 15, and between the egg cells of each row. Support posts 16 define an upper bearing surface 17 and are connected with each other along the centerline of the carton by longitudinal dividers 18 integral with adjacent posts 16. Each of the dividers 18 is recessed downwardly from the bearing surface 17 of each post 16 to define an upwardly opening crescent shaped recess 13 between each pair of adjacent posts 16. Similarly, each post 16 is also connected with the outside edges of the section 11 by a pair of transverse dividers 19 formed integrally with the post 16 and edge of the carton. The dividers 19 extend outwardly from each post 16 in diametrically opposite directions and are recessed downwardly from the post 16 and edge of the carton to define an upwardly opening crescent-shaped recess 23 that is deeper than recesses 13. Thus, the protrusions 14, the posts 16, the longitudinal dividers 18 and the transverse dividers 19 define the bottom or lower portions of the individual egg cells or pockets 15. The protrusions 14, dividers 18 and 19, and posts 16 are joined together to form smoothly flowing surfaces to prevent damage to eggs carried therein.

The cover 12 is formed at the same time as bottom section 11 and is connected along one of its edges to the bottom section by an integral hinge 20. Hinge 20 is formed by impressing at least one elongated crease in the material extending between the bottom section 11 and cover 12. For a more detailed description of hinge 20, reference is made to applicant's copending application, Ser. No. 601,947, filed Dec. 15, 1966.

Cover 12 is generally rectangular in shape and includes outwardly sloping side walls 21 and end walls 22. The upper wall 24 is generally flat in configuration and includes a row of downwardly extending hollow support posts 26 which define depressions 25 therein which open onto the upper surface of wall 24. The posts 26 are positioned directly above the support posts 16 of the bottom section 11 and define contact surfaces 27 on the depending end of the posts 26 which extend a distance inwardly of the cover 12 sufficient to rest on and be supported by bearing surfaces 17 of support posts 16 when the cover is closed, as best shown in FIG. 6.

It will be observed that each portion 16 forms crudely an inverted frusto-conical member, the sides of which flare or diverge upwardly and outwardly from the flat base or surface 27. There is one less post 26 than the cavities or egg cells 15. The posts 26 are so arranged in evenly spaced relationship that the surfaces 27 are brought into registry with the surfaces 16 when the carton is in a closed condition. In such an arrangement, the eggs disposed in the cells 15 are confined by the downwardly converging posts 26 and the upwardly covering partitions 19.

Since the carton 10 is formed from a unitary sheet of a foamed plastic material such as polystyrene, the carton may be readily and easily cut with a hot wire so as to separate any number of eggs from the original dozen carried by the carton. Preferably, the carton is cut transversely, and usually the carton is cut along its transverse center so as to provide for six eggs in one portion and six in the other portion. In any event, the cooperation of the partitions 19 and the converging posts 26 retain the eggs in place, regardless of whether the carton is cut along a transverse axis or along a longitudinal axis, provided the cut is made between the adjacent cells so as to sever a post 26.

As stated previously, the carton 10 is made out of a foamed plastic material such as expandible polystyrene which has a natural resiliency greater than paper products, which is highly desirable. It has been found, however, that when such material is formed in a mold into the carton 10, there is a tendency of the cover to sway down in the middle and up toward the opposing ends thereof so as not to close properly, especially when a heat responsive label 51 is applied thereto and shrunk to add longitudinal and transverse stability to the carton. This problem is overcome by varying the lengths of the depending posts 26 in the cover 12. For sake of clarity the posts 26 have been individually referenced 26a–26c, as best seen in FIG. 4. The lengths of posts 26 are progressively longer from each outer post 26a adjacent the ends of the carton 10 toward the center post 26c. The two intermediate posts 26b adjacent the center post 26c are of equal length and slightly shorter than the center post 26c, and outer posts 26a are of equal length and slightly shorter than intermediate posts 26b.

When the cover 12 is closed and posts 26 rest on posts 16 the posts 26c, and 26b force the center of the cover 12 up while locking lugs 32 force the ends of the cover 12 down as set forth hereinbelow to cause the top wall 24 to be deformed from a swayed condition as shown by dashed lines in FIG. 4 to a flat condition as shown in solid lines in FIG. 4. While the lengths of posts 26a–26c may vary from application to application, it has been found that a satisfactory flat condition of top wall 24 is achieved if posts 26a in their undeformed condition have a length such that their outer bearing surfaces 27 are flush with the lower edges of side walls 21 of the cover 12, the intermediate posts 26b in their undeformed condition are approximately 3/32 inch longer than posts 26a in their undeformed condition, and the center post 26c in its undeformed condition is approximately 5/32 inch longer than the outer posts 26a in their undeformed condition.

Adjacent posts 26 are connected together by longitudinal separators 28 integral with adjacent posts 26 and extending along the center of the cover 12. Transverse separators 33 integral with each post 26 extend outwardly therefrom on diametrically opposite sides thereof toward, but not to side walls 21. The transverse separators 33 define a concave surface 34, best seen in FIG. 6, extending from the free end of each post 26 to the inside of the top wall 24. As seen in FIG. 6, each transverse separator 33 is of sufficient width to prevent eggs carried in adjacent longitudinally spaced egg cells from becoming in contact with each other while the carton is closed. Likewise, the longitudinal separators 28 provide separation of transversely adjacent eggs when the egg carton is closed.

The junction of posts 26, separators 28 and 33, define smoothly flowing surfaces to prevent damage to eggs over which they extend. The posts 26, walls 21 and 24, and separators 28 and 33 serve the same function with respect to the top or large end of an egg as do the posts 16, protrusions 14, and dividers 18 and 19. To facilitate egg separation, it will be seen that the posts 16 in combination with dividers 18 and 19, and the posts 26 in combination with separators 28 and 32 define a cellular structure having a generally diamond shaped cross-section.

Figure 9:
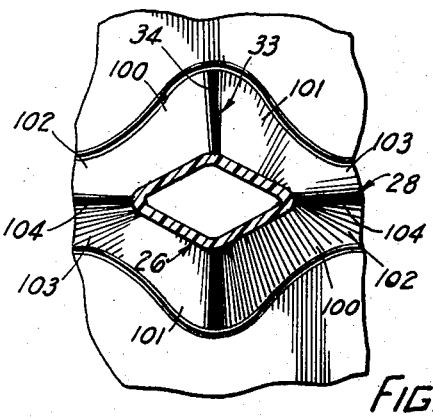
FIG. 9 is a transverse cross-sectional view of one of the posts in the cover taken along line 9—9 in FIG. 6.

Referring more particularly to FIGS. 6 and 9, the transverse separators 33 include walls 100 and 101 which are integral along a common edge defining concave surfaces 34 and also with posts 26 at their lower depending ends as seen in FIG. 6. These walls 100 and 101 flare outwardly from the posts 26 as they extend upwardly therefrom to join with upper wall 24. The extending edges of walls 100 and 101 join with the extending edges of walls 102 and 103 respectively, of longitudinal separators 28. Walls 102 and 103 of separators 28 are also integral with each other along a common edge defining concave surfaces 104 corresponding to surfaces 34 and join with post 26 at their lowermost depending ends as seen in FIGS. 4 and 6. Walls 102 and 103 also flare upwardly and outwardly to join with upper wall 24. Surfaces 34 and 104 are concave in a vertical plane and surfaces 100 and 102 as well as surfaces 101 and 103 in combination define outwardly flaring concave surfaces in a horizontal plane. These concave surfaces in the vertical and horizontal planes serve to cradle and separate the eggs in cells 23 to prevent breakage thereof by contact with each other during transit.

The outwardly sloping side wall 21 in FIG. 6 on that side of cover 12 away from hinge 20 defines a pair of substantially rectangular locking apertures 30 therethrough located intermediate the top and bottom edges of wall 21. The side of the bottom section 11 of the carton 10 away from hinge 20 includes an upwardly extending locking flap 31. The locking flap 31 is integrally connected to section 11, extends along the upper edge thereof for approximately two thirds of its length, and is pivoted to the bottom section 11 by means of an elongated crease C formed in the material connecting same. As is best shown in FIGS. 7 and 8, crease C is formed in the material to create a substantially flat bottom wall B bordered on opposite edges by a pair of substantially parallel upwardly extending diverging arcuate shaped bearing walls S, S'.

With this construction, locking flap 31 can be folded upwardly and inwardly about crease C to the position shown in FIG. 6 when sufficient force is applied thereto to overcome the strength of the bottom wall B. The cover 12 can then be placed over flap 31 by stretching the wall 21 of cover 12 forwardly outward approximately 1/8" so that the locking flap 31 will extend just within the inside of cover 12 in juxtaposition with the inside of wall 21 when cover 12 is closed. These two combined actions of the folding flap 31 and stretching wall 21 serve to set up a stress in the whole carton to insure that it will remain closed without depending on the eggs in the carton to hold the flap 31 in position. This is because bearing walls S, S' abut each other as seen in FIG. 8, so that the natural resiliency of the foamed plastic material of the carton has sufficient spring action to cause the locking flap 31 to be forced back toward wall 21 of cover 12.

The locking flap 31 includes a pair of lugs 32 complementarily shaped to be received in apertures 30 to hold the cover 12 in a closed condition as seen in FIG. 6, each lug having a tapered upper surface U and a substantially flat lower surface L to facilitate moving lugs 32 into apertures 30 and to maintain lugs 32 in locking engagement with cover 12 once lugs 32 are in apertures 30. Bearing walls S, S' are so constructed and arranged to constantly force the flap 31 toward side wall 21' to maintain lugs 32 within apertures 30 and hold the cover 12 in a closed position while at the same time moving the flap 31 away from any eggs carried in the cells or pockets 15 of the carton. The angle $\alpha$ defined between the horizontal and flap 31 before contact of walls S, S' is dependent on the angle $\beta$ between the horizontal and the side wall 21' of cover 12. It has been found that the angle $\alpha$ should be between 90° and 110° while the angle $\beta$ should be between 70° and 90°. The angle $\alpha$ is preferably 102½° and the angle $\beta$ is preferably 78½° without deformation of bearing walls S, S' to prevent damage to the eggs in the carton while at the same time insuring locking contact between cover 12 and flap 31. Further pivotal movement of flap 31 is resisted by bearing walls S, S' yieldably abutting each other and developing compression forces F therein substantially perpendicular to a tangent T drawn to the point of abutment as seen in FIG. 8.

Figure 3:
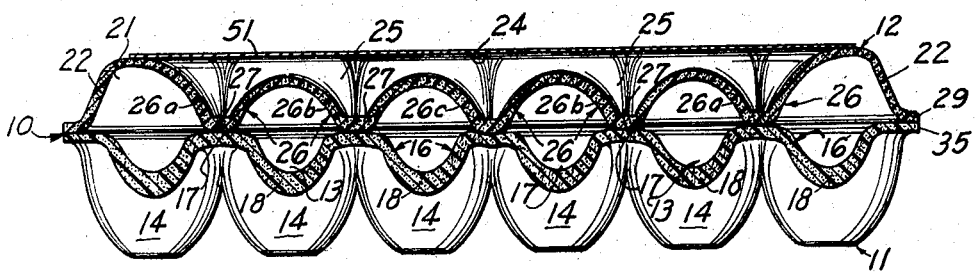
FIG. 3 is a longitudinal cross-sectional view of the egg carton.

Referring specifically to FIGS. 1, 3, and 6, it will be seen that when posts 26 are in bearing contact with posts 16, the lugs 32 are engaging cover 12 at apertures 30. It will also be noted that lugs 32 and apertures 30 are located just outboard of the intermediate posts 26b. Therefore, as the upward forces are exerted on the cover 12 along its center portion through posts 26b and 26c, downward forces are exerted on the cover 12 by the lugs 32 outboard of the upward forces. The result thereof is that the cover 12 is straightened from its swayed condition to define the proper size egg cells in the carton 10.

Flanges 35 extend around the perimeter of the bottom section 11, at each of its ends, between locking flap 31 and hinge 20. A recess 36 is formed in each flange at a point intermediate the rows of egg cells to allow air to circulate in carton 10 when closed.

Referring to FIG. 4, it can be seen that egg cells 15 in the bottom section 11 together with the posts 26, and the separators 28 and 33 in the cover 12 form enclosures 38 that are slightly longer than the highest commercial grade or extra large egg 37 as seen in dashed lines in FIG. 6. The bottom 39 of each egg cell 15 is curved upwardly to present a convex resilient surface 39a to engage the lower or smaller end of the eggs in cells 15. The extra large egg 37 is shown in the right egg cell 15 in FIG. 6 while a smaller egg 40 is shown in the left egg cell 15 in FIG. 6. The cells 15 are dimensioned to support the various sizes of eggs 37 or 40 approximately about their lower one-third while they rest on surface 39a. The egg 40 is shown not deforming the surface 39a while the egg 37 has deformed surface 39a so that egg 37 can be accommodated in cell 15 as well as egg 40. In both instances, however, that portion of the bottom 39 supporting egg 37 or 40 is above the lower extremity of protrusions 14 so that any shock to the bottom of carton 10 can be absorbed without damage to eggs 37 or 40.

Referring now particularly to FIGS. 5 and 6, cover 12 is provided with a pair of internally projecting ridges 50 (only one of which is shown) which extend across the bottom surface of cover 12 substantially prependicular to cover hinge 20. Ridges 50 are detailed in length to extend from adjacent one side of each post 26b across the bottom surface of top wall 24 and down the front side wall 21 adjacent locking apertures 30. On the other side of each post 26b ridges 50 extend from adjacent each post 26b across the bottom surface of top wall 24 to the intersection of wall 24 with the rear side wall 21. The inwardly projecting dimension of ridges 50 are detailed such that ridges 50 will cooperate with the upper extended edge of locking flap 31 to provide a yieldable biasing action between cover 12 and locking flap 31 as shown in FIG. 5 to improve the locking relationship between lugs 32 and locking apertures 30 to constantly force each lug 32 into locking engagement with apertures 30 and maintain the cover 12 in a closed position. Moreover, the ridges 50 serve to reinforce cover 12 to further prevent the outward force by flap 31 on side wall 21 from causing the lugs 32 to inadvertently release cover 12 and allow it to open.

As shown in the figures, a label 51 may be applied to cover 12 along top wall 24 and over depression 25. Label 51 will serve a dual function to identify the egg source and to add longitudinal and transverse strength to cover 12. For a more detailed explanation of label 51, reference is made to U.S. Pat. No. 3,396,895.

Frequently, it is necessary to sell eggs in one-half dozen lots. The carton illustrated can be separated transversely across the center thereof along the center of post 26c by cutting same with a cutting device such as a heated wire. This leaves the upwardly and outwardly flaring and diverging separators 33 connected to post 26c to retain the eggs in the cells 38 and this prevents the eggs from falling from the carton after separation as was a common problem with prior art cartons.

OPERATION

When cartons 10 are received by the egg producer, the eggs are placed in egg cells 15 by appropriate egg handling machinery and cover 12 is pivoted about its hinge 20 to its closed position. The locking flap 31 is positioned so that it is confined within the cover 12, and when the cover is firmly pressed toward the bottom section 11, the lugs 32 on the locking flap 31 are received in the locking apertures 30 of the cover 12, thereby securely fastening the cover 12 to the bottom section 11. The bearing walls S, S' urge the flap 31 toward side wall 21 to help maintain lugs 32 in apertures 30.

When the cover 12 is pivoted to its closed position, the posts 26 thereof come to rest on the upper bearing surfaces 17 of support posts 16 in bottom section 11 so that the cover 12 is supported along its centerline. The lengths of posts 26 are detailed as hereinabove described to provide an increased supporting force in the center of cover 12. Of course, the flange 29 of the cover 12 rests on the flanges 35 at either end of the bottom section 11 and the cover 12 receives some support from the ridges 50 in cover 12 bearing against the upper edge of the locking flap 31.

As is shown in FIG. 6, support posts 16 and the dividers 18 and 19, which form the egg cells 15, keep the eggs 37 or 40 from coming into contact with each other. Of course, recesses 13 and 23 in dividers 18 and 19 allow a person to reach into the carton 10 and easily retrieve an egg from one of the egg cells 15. The posts 26, and separators 28 and 33 of the cover 12 complement the shape of support posts 16 and dividers 18 and 19 so that the eggs are also separated in the cover 12.

The rounded configuration of each egg cell 15 is such that when an individual egg cell is inadvertently struck by an exterior object, indentation or other damage of the cell will be resisted, spreading the shock of the blow throughout a large portion of the cell; whereas, if the egg cells were of flat configuration, indentation or damage thereof would more easily occur at the point of contact of the exterior object. The complementary rounded surfaces of both the egg and that portion of the cell which contacts the egg cooperate to reinforce each other so that the egg actually makes the cell stronger, thus further resisting damage danger to the egg. Furthermore, the upwardly curved support surface 39a defined at the bottom of each egg cell 15 removes an egg from the lower surface of the carton so that if the carton of eggs is dropped and the bottom surface 39 becomes damaged or is temporarily depressed to a certain extent, the possibilities are that the depression will not be sufficient to cause the interior surface of the egg cell to come into contact with the shell of the egg, or if the shock is substantially severe or localized, it will be spread through the cells rather than concentrated at the impact point.

When the cover 12 is pivoted to its closed position, the indentation 36 in the flanges 35 are such that they extend inwardly of the flange 29 of the cover 12 a distance sufficient to define an air vent for circulation of air inside the carton. Thus, while the material from which the carton is made, foam plastic, functions as an insulate air is allowed to circulate through the carton. This enables the eggs to be chilled when placed in a refrigerator but prevents the transfer of heat from outside the carton through the carton to the eggs when the carton is placed on a warm or hot surface.

The flange 29 of the cover 12 and the flanges 35 of the bottom section 11 project slightly outwardly of the main body portion of the carton 10 so as to act as a bumper for the carton to prevent damage of the carton or its eggs by inadvertently bumping the carton against another object.

The configuration of the carton is such that when a plurality of cartons are manufactured from a single mold and the adjacent cartons cut away from each other, if the trimming action of separating the cartons is not accurately performed, the cartons will not be damaged and the locking function of locking flap 31 will not be impaired. For instance, if the flange 29 of the top cover 12 is inaccurately trimmed, the only effect on the carton would be a foreshortened or wider flange, which would probably not affect its overall ability in storing eggs. Furthermore, if the locking flap 31 of the bottom section 11 is inaccurately trimmed, the greater or lesser width of the flap will not be detrimental in its function due to the use of ridges 50.

It should be appreciated that the fabrication of the carton from foam plastic provides a substantially soft interior surface for the eggs and creates a rather pliable carton that will absorb potential punctures from sharp objects without appreciable harm. While foam plastic has been stated as the material from which the carton has been fabricated, it should be understood that this term is to be broadly construed to include polystyrene, aerated polypropylene, and other similar materials. The substantially rounded configuration of the individual egg cells 15 provides a rigidity not accomplished by flat sided cells and the posts 26 of the cover 12 provide a similar function. While the enclosures 38 formed by the egg cells 15 and the top cover 12 must be large enough to accommodate the extra large grade egg, the configuration of the cells 15 is such that the smaller eggs 40 (FIG. 6) will be maintained within the enclosures 38 in such a manner that they will not come into contact with each other. Also, the smaller eggs 40 will usually be displaced from the bottom surface 39 of the cells 15 by curved support 39a. Thus, the egg carton is useable in a single size for the various grade eggs.

FIGS. 1 and 7 show the flap 31 lying in a substantially horizontal position before being folded. It is understood that the flap 31 may lie at another angle before being folded. An angle of approximately 20° above the horizontal has been found to be advantageous for automatic folding equipment.

It will be obvious to those skilled in the art that many variations may be made in the embodiments chosen for the purpose of illustrating the present invention without departing from the scope thereof as defined by the appended claims.

We claim:
1. An egg carton comprising:
   (a) a lower section comprising a plurality of upstanding first posts of equal height distributed lengthwise in said lower section; and,
   (b) a cover comprising a plurality of depending members adapted to rest on said first posts when said cover is closed over said lower section, said depending members depending a greater distance progressively from each end of the carton toward the center thereof.

2. The egg carton of claim 1 where transverse and longitudinal dividers are associated with said first posts.

3. The egg carton of claim 2 wherein said depending members are second posts which are progressively longer from each end of the carton toward the center thereof.

4. The egg carton of claim 3 wherein there are five first posts and five second posts and wherein said center second post is approximately $5/32$ inch longer than said outer second post and said intermediate second posts between said center and outer second posts are 3/32 inch longer than said outer second post.

5. The egg carton of claim 1 wherein said cover member is integrally hinged to said lower section and the carton is made of resilient formed plastic material.

References Cited

UNITED STATES PATENTS

| | | | |
|---|---|---|---|
| 2,843,304 | 7/1958 | Reifers | 229—29 M |
| 2,668,652 | 2/1954 | Russell | 229—2.5 X |
| 2,815,162 | 12/1957 | Grant | 229—2.5 |
| 3,145,895 | 8/1964 | Reifers | 229—2.5 |
| 3,356,277 | 12/1967 | Hohnjec | 229—2.5 |
| 3,138,314 | 6/1964 | Reifers et al. | 229—29 M X |
| 3,289,911 | 12/1966 | Boyd et al. | 229—45 X |
| 2,990,094 | 6/1961 | Reifers | 229—2.5 |
| 3,259,294 | 7/1966 | Hartmann | 229—2.5 |
| 3,372,854 | 3/1968 | Marcus | 229—44 |
| 3,458,108 | 7/1969 | Howarth et al. | 229—2.5 |

EVON C. BLUNK, Primary Examiner

W. S. CARSON, Assistant Examiner

U.S. Cl. X.R.

229—2.5, 45